(12) United States Patent
Nomura

(10) Patent No.: US 6,948,375 B2
(45) Date of Patent: Sep. 27, 2005

(54) ELASTIC MEMBER FOR ATTACHING SENSOR DEVICE AND SENSOR USING THE SAME

(75) Inventor: Takashi Nomura, Anjo (JP)

(73) Assignee: Denso Corporation, Kariya (JP)

( * ) Notice: Subject to any disclaimer, the term of this patent is extended or adjusted under 35 U.S.C. 154(b) by 20 days.

(21) Appl. No.: 10/690,593

(22) Filed: Oct. 23, 2003

(65) Prior Publication Data

US 2004/0083817 A1 May 6, 2004

(30) Foreign Application Priority Data

Oct. 30, 2002 (JP) ........................................ 2002-316449

(51) Int. Cl.[7] ................................................. G01L 7/00
(52) U.S. Cl. .......................................... 73/756; 411/45
(58) Field of Search ....................... 73/700–756; 411/45

(56) References Cited

U.S. PATENT DOCUMENTS 5,325,734 A    7/1994  Jordan 5,945,606 A    8/1999  Tokunaga et al.

FOREIGN PATENT DOCUMENTS

| EP | 0 579 308 A1 | 6/2003 |
|---|---|---|
| FR | 2 724 727 A | 9/1994 |
| WO | 652 420 A1 | 11/1994 |
| WO | WO 01/27564 A1 | 4/2001 |

Primary Examiner—William Oen
Assistant Examiner—Jermaine Jenkins
(74) Attorney, Agent, or Firm—Posz Law Group, PLC

(57) ABSTRACT

An elastic member attaches a sensor device having a sensor protrusion portion into a through hole of a sensor attachment member in such a manner that the elastic member is temporarily assembled onto the sensor protrusion portion and inserted together with the sensor protrusion portion into the through hole. The elastic member includes a hollow portion and a rear end portion having a rear end flange and a bead portion. The rear end flange protrudes from an outer circumferential surface of the rear end portion for locking on a peripheral portion of one end of the through hole. The bead portion is elastically deformable and protrudes from either or both of one surface of the rear end flange facing the sensor device and the other surface of the rear end flange facing the sensor attachment member.

12 Claims, 3 Drawing Sheets

ELASTIC MEMBER FOR ATTACHING SENSOR DEVICE AND SENSOR USING THE SAME

CROSS REFERENCE TO RELATED APPLICATION

This application is based on Japanese Patent Application No. 2002-316449 filed on Oct. 30, 2002, the disclosure of which is incorporated herein by reference.

FIELD OF THE INVENTION

The present invention relates to an elastic member for attaching a sensor device having a protrusion portion.

BACKGROUND OF THE INVENTION

The inventor of the present invention has been disclosed in Japanese Unexamined Patent Application Publication No. H10-122914 (U.S. Pat. No. 5,945,606), which is an elastic member for attaching a sensor device having a protruded portion in a through hole of a sensor attachment member by attaching one-touch operation.

As illustrated in FIG. 5A, the elastic member 1 for attaching a sensor device 2 has therein a hollow portion 40 for attaching a sensor protrusion portion 3 of the sensor device 2. The elastic member 1 is formed by integrally molding of a fore end portion 6 having a fore end protrusion 9 and a fore end flange 10, an intermediate portion 7 including a tapered portion 13 which covers part of the sensor protrusion portion 3 and an intermediate protrusion 14, and a rear end portion 8 having a rear end flange 17. The elastic member 1 for attaching the sensor device 2 is temporarily assembled onto the sensor protrusion portion 3 of the sensor device 2 and inserted into a through hole 5 of a sensor attachment member 4. After the fore end flange 10 is passed through the through hole 5, as illustrated in FIG. 5B, the fore end flange 10 and the rear end flange 17 is locked on the open end peripheral portion of the through hole 5 so that the fore end protrusion 9 is engaged with a concavity 16 of the sensor protrusion portion 3. Thus, the sensor device 2 is thereby firmly attached to the sensor attachment member 4.

However, if the intermediate portion 7 of the elastic member 1 for attaching the sensor device 2 is so formed that the length of the intermediate portion 7 in contact with the inner circumferential surface of the through hole 5 is equal to the upper limit value of tolerance, a gap is produced between the sensor attachment member 4 and the elastic member 1, as illustrated in FIG. 5D. If vibration is applied with the gap present as described above, the elastic member 1 for attaching the sensor device 2 is also vibrated. Therefore, wear, cracking, or the like may be produced in the elastic member 1, so that the sensor device 2 drops off.

Further, if the through hole 5 of the sensor attachment member 4 is so formed that the diameter of the through hole 5 is equal to the lower limit value of tolerance, as illustrated in FIG. 5C, the fore end protrusion 9 of the elastic member 1 for attaching the sensor device 2 does not go back to the concavity 16 of the sensor protrusion portion 3. Therefore, the required holding power for holding the sensor device 2 cannot be obtained, so that the sensor device 2 may drop off.

SUMMARY OF THE INVENTION

In view of the above problem, it is an object of the present invention to provide an elastic member for attaching a sensor device with large holding power for holding the sensor device. It is another object of the present invention to provide a sensor having an elastic member for attaching a sensor device with large holding power for holding the sensor device.

An elastic member attaches a sensor device having a sensor protrusion portion into a through hole of a sensor attachment member in such a manner that the elastic member is temporarily assembled onto the sensor protrusion portion and inserted together with the sensor protrusion portion into the through hole so that the sensor device is attached to the sensor attachment member through the elastic member. The elastic member includes a hollow portion having an inner circumferential surface for being temporarily assembled onto the sensor protrusion portion, and a rear end portion having a rear end flange and a bead portion. The rear end flange protrudes from an outer circumferential surface of the rear end portion for locking on a peripheral portion of one end of the through hole. The bead portion is elastically deformable and protrudes from either or both of a surface of the rear end flange facing the sensor device and a surface of the rear end flange facing the sensor attachment member.

If the elastic member is so formed that the length of the portion of the elastic member in contact with the sensor attachment member (the length of the intermediate portion) is equal to the upper limit of tolerance on a design value, and, for example, the thickness of the sensor attachment member is in accordance with a design value, a gap is produced between the elastic member and the sensor attachment member after the sensor device is assembled onto the sensor attachment member through the elastic member. If the sensor attachment member is so formed that the diameter of the through hole of the sensor attachment member is equal to the upper limit of tolerance, and, for example, the outside diameter of the intermediate portion of the elastic member is in accordance with a design value, a gap is also produced between the inner circumferential surface of the through hole and the outer circumferential surface of the elastic member after the sensor device is assembled onto the sensor attachment member through the elastic member. If vibration is applied with such a gap present, the elastic member also vibrates and thus wear, cracking, or the like can be produced in the elastic member. Therefore, the sensor device can drop off. According to the present invention, an elastically deformable projected bead portion is formed on the rear end flange to solve the above problem. As a result, during assembling, the bead portion on the rear end flange is pressed by the sensor device and elastically deformed, so that the sensor attachment member is sandwiched and fastened between the bead portion or the rear end flange with the bead portion formed thereon and the fore end flange. Thus, the holding power for holding the sensor device is enhanced.

Preferably, the bead portion is integrally molded with the rear end flange. In this case, the bead portion is in projected shape, so that stress is exerted on the projected portions. Therefore, the bead portion is preferably formed by integral molding method in terms of durability. Further, the integral molding also allows cost reduction.

Preferably, the elastic member is rotation-symmetrical around a center axis of the elastic member, the center axis being along with a direction of insertion of the sensor protrusion portion. When the elastic member is formed in rotation symmetrical shape, the elastic member becomes robust in terms of structure. Further, since the bead portion is disposed in balance, the sensor device is prevented from being slantingly installed on the sensor attachment member.

Preferably, a height of the bead portion from the surface of the rear end flange is equal to a total length obtained by adding a predetermined margin and an upper limit value of tolerance of a length of part of the elastic member that contacts an inner circumferential surface of the through hole. One of possible causes of a gap being produced between the elastic member and the sensor attachment member is that the elastic member is so formed that the length of the portion of the elastic member in contact with the inner circumferential surface of the through hole in the sensor attachment member (the length of the intermediate portion) is equal to the upper limit value of tolerance. Therefore, a predetermined margin is added to the upper limit value of tolerance on the length of the portion of the elastic member in contact with the inner circumferential surface of the through hole with deviation (tolerance) in the thickness of the sensor attachment member taken into account. With this length taken as the length of the bead portion, the elastic member can hold the sensor attachment member and the holding power for holding the sensor device can be enhanced.

Preferably, the intermediate portion further includes a thick portion disposed between the intermediate protrusion and the rear end flange, thickness of the thick portion is thicker than thickness of the intermediate portion. Conventionally, the sensor attachment member is so formed that the diameter of the through hole therein is equal to the lower limit value of tolerance, and the elastic member having the outside diameter of the intermediate portion of which is larger than the diameter of the through hole is temporarily assembled onto the sensor device and inserted into the through hole, so that the fore end of the sensor protrusion portion is protruded from the fore end of the elastic member. At this time, frictional force created between the sensor attachment member and the inner circumferential surface of the through hole or the sensor protrusion portion is large, and the fore end protrusion of the elastic member does not return to the concavity of the sensor protrusion portion and required holding power is not obtained. Therefore, the sensor device may drop off. However, by forming the thick portion thicker than the intermediate portion between the intermediate protrusion and the rear end flange, reaction force which restores elastically deformed elastic member is increased, and it is possible to return the fore end protrusion of the elastic member from the fore end of the sensor protrusion portion to the concavity and to engage the fore end protrusion with the concavity. Therefore, the holding power for holding the sensor device can be enhanced.

Preferably, the thickness of the thick portion is equal to or thinner than thickness of the intermediate protrusion. This is because when the thickness of the thick portion is equal to or less than the thickness of the intermediate portion, reaction force cannot be sufficiently obtained to return the fore end protrusion to the concavity of the sensor protrusion portion. Further, because when the thickness of the thick portion is thicker than the thickness of the intermediate protrusion, the elastically deformable range is departed from so that cracking or the like may be produced in the elastic member. Therefore, by forming the thick portion so that the thickness of the thick portion is within the above-described range, the fore end protrusion can be returned from the fore end of the sensor protrusion portion to the concavity by reaction force. The reaction force arises from the increased thickness of the fore end protrusion so that the fore end protrusion can be engaged with the concavity. Thus, the holding power for holding the sensor device is enhanced.

Further, a sensor includes a sensor device having a sensor protrusion portion, a sensor attachment member having a through hole, and an elastic member for attaching the sensor device into the through hole in such a manner that the elastic member is temporarily assembled onto the sensor protrusion portion and inserted together with the sensor protrusion portion into the through hole so that the sensor device is attached to the sensor attachment member through the elastic member.

In the above sensor, the sensor device is attached by the elastic member with large holding power for holding the sensor device.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
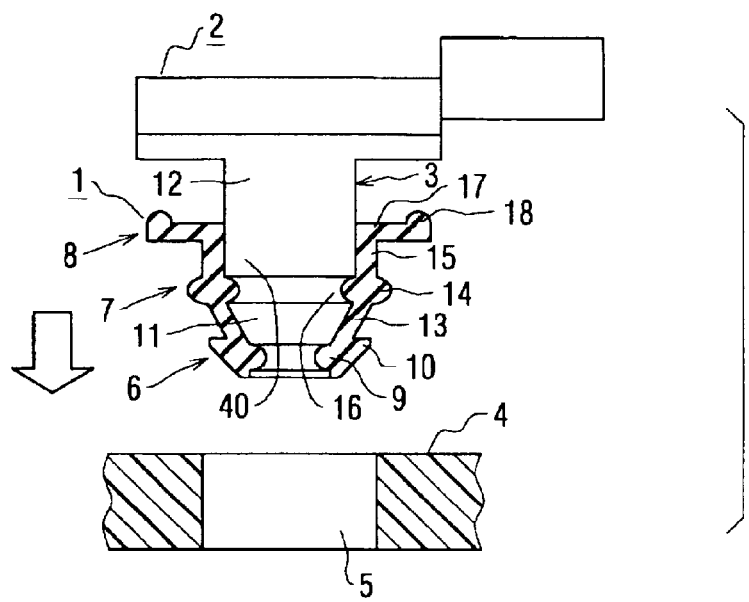
FIG. 1 is a schematic cross-sectional view showing an elastic member and a sensor attachment member, according to a preferred embodiment of the present invention.

FIG. 1 is a cross-sectional view illustrating an elastic member 1 for attaching a sensor device 2, which is installed and temporarily assembled onto a sensor protrusion portion 3 of a sensor device 2. The elastic member 1 is inserted into a through hole 5 together with the sensor protrusion portion 3. The through hole 5 is formed in a sensor attachment member 4. When installation of the sensor device 2 on the sensor attachment member 4 is completed, the elastic member 1 fastens the sensor device 2 in the through hole 5.

The elastic member 1 has a hollow portion 40, into which the sensor protrusion portion 3 of the sensor device 2 is to be inserted, and is rotation-symmetrical about the center line thereof in the direction of insertion of the sensor protrusion portion 3, indicated by an open arrow. With respect of structure, the elastic member 1 is composed of a fore end portion 6, an intermediate portion 7, and a rear end portion 8, and is integrally formed of H-NBR (acrylonitrile-butadiene rubber containing hydrogen as an additives), which contains an elastically deformable self-lubricating component (i.e., the H-NBR being kneaded with a lubricating component). In addition to the foregoing, various rubbers, such as silicone rubber, fluoro rubber, acrylic rubber, and NBR, can be used for the elastic member 1. Any material other than rubber may be used for the material of the elastic member 1 as long as the material has appropriate elasticity. Although the rubber kneaded with the lubricating component is used in the elastic member 1, assembling operation may be facilitated by adopting materials containing a lubricating component for the outer circumferential surface of the sensor protrusion portion 3, the inner and outer circumferential surfaces of the elastic member 1, the inner circumferential surface of the through hole 5, and the like so as to reduce friction between the sensor protrusion portion 3, the elastic member 1, and the through hole 5 without kneading the lubricating component.

The fore end portion 6 is composed of a fore end protrusion 9 and a fore end flange 10. The fore end protrusion 9 is formed on the inner circumferential surface of the fore end portion 6, and is an annular projection. The fore end flange 10 protrudes from the outer circumferential surface thereof. In the temporarily assembled state illustrated in FIG. 1, the fore end of the sensor protrusion portion 3 is locked on the rear end side of the fore end protrusion 9 of the elastic member 1.

The intermediate portion 7 covers both a top end 11 and part of a shaft 12 of the sensor protrusion portion 3, and is composed of a tapered portion 13, an intermediate protrusion 14, and a thick portion 15. The outer circumferential surface and inner circumferential surface of the tapered portion 13 are tapered. The intermediate protrusion 14 is annularly formed on the inner circumferential surface of the intermediate portion 7. The thick portion 15 is located between the intermediate protrusion 14 and the rear end portion 8, and is in cylindrical shape. Although the tapered portion 13 is tapered, this portion does not necessarily have to be tapered but may be cylindrical. In the temporarily assembled state illustrated in FIG. 1, the intermediate protrusion 14 is engaged with a concavity 16 of the sensor device 2. The concavity 16 is formed between the top end 11 and the shaft 12 of the sensor protrusion portion 3.

The rear end portion 8 is composed of a rear end flange 17 and a bead portion 18. The rear end flange 17 protrudes from the outer circumferential surface thereof, and is locked on the peripheral portion of the open end of the sensor attachment member 4. The bead portion 18 is formed on the surface of the rear end flange 17 in contact with the sensor device 2, and is in projected shape. The bead portion 18 may be formed on the surface of the rear end flange 17 in contact with the sensor attachment member 4 or may be formed on both the surfaces.

With respect of design values of individual part lengths, the thickness of the fore end protrusion 9 is substantially equal to the width of the concavity 16 of the sensor protrusion portion 3, and the distance between the fore end flange 10 and the rear end flange 17 (the length of the intermediate portion 7) is substantially equal to the thickness of the sensor attachment member 4. Further, the total length of the intermediate portion 7 and the rear end portion 8 of the elastic member 1 is substantially equal to or preferably slightly longer than the length of the shaft 12 of the sensor device 2 in the direction of insertion into the through hole 5. Therefore, the sensor device 2 is firmly fastened to the sensor attachment member 4 through the elastic member 1.

In addition, the elastic member 1 is so formed that the outside diameter of the fore end of the fore end portion 6 thereof is substantially equal to or slightly smaller than the diameter of the through hole 5, and thus insertion of the elastic member 1 into the through hole 5 is facilitated. The diameter across the inner circumferential surface of the thick portion 15 of the elastic member 1 is substantially equal to the outside diameter of the shaft 12 of the sensor protrusion portion 3, and the diameter across the outer circumferential surface of the thick portion 15 is substantially equal to the diameter of the through hole 5.

Figure 2:
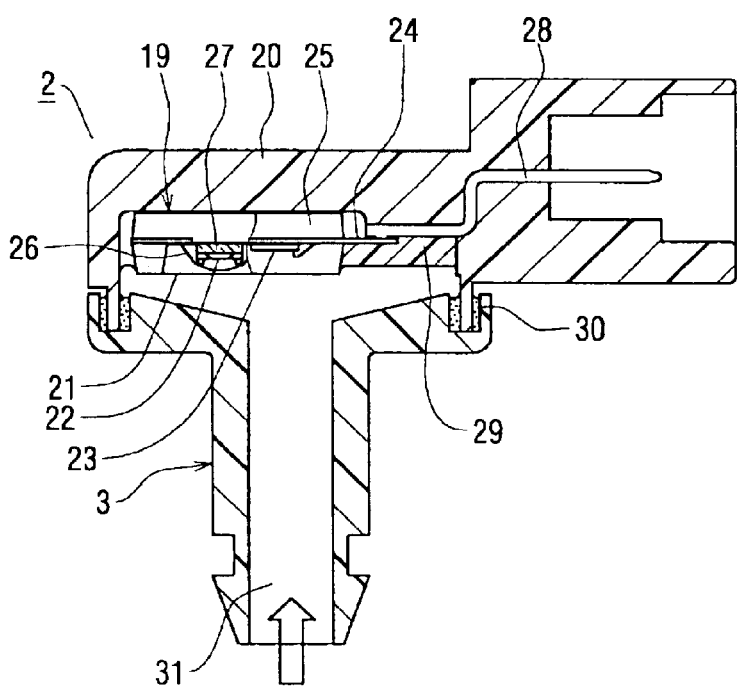
FIG. 2 is a cross-sectional view showing a sensor device, according to the preferred embodiment.

The sensor device 2 in this embodiment is applied to, for example, a pressure sensor device suitably used to measure the intake pressure of automobiles. As shown in FIG. 2, the sensor device 2 includes a molded IC 19 as an electric element for pressure detection accommodated in a sensor case 20.

A holder 21 is formed in the molded IC 19, and a sensor element 22 for detecting pressure is housed and held in the holder 21. The molded IC 19 is formed by covering a signal processing IC 23 and lead frames 24 with molding resin 25, such as epoxy resin, for the purpose of protection. The signal processing IC 23 amplifies signals from the sensor element 22. The lead frames 24 takes out the signals.

The sensor element 22 is disposed so that the pressure sensing surface thereof for accepting pressure is positioned in the opening of the holder 21, and the sensor element 22 and the lead frames 24 are electrically connected with each other by wire bonding using wires 26 of gold or the like. The sensor element 22 is constructed by, for example, forming a plurality of diffused resistors on a diaphragm formed on a single crystal silicon substrate and bridge-connecting the diffused resistors. The single crystal silicon substrate is bonded to a seat 27 made of, for example, glass by a glass bonding method or the like. The seat 27 is bonded to the bottom face of the holder 21 by silicone resin or the like.

The sensor case 20 is formed of high-temperature resin such as PPS (poly phenylene sulfide), PBT (poly butylene terephthalate), or the like. The lead frames 24 are electrically connected with a connector pin 28 to be connected with an external processing circuit (not shown). The area around the connecting point is sealed with potting material 29. The sensor protrusion portion 3 made of high-temperature resin such as PPS and PBT is attached to the sensor case 20 by adhesive 30. In the sensor protrusion portion 3, a pressure introduction port 31 for introducing pressure to the pressure sensing surface of the sensor element 22 is formed, and the sensor protrusion portion 3 can be inserted into the through hole 5 of the sensor attachment member 4 together with the elastic member 1 by engaging the intermediate protrusion 14 of the elastic member 1 with the concavity 16 formed between the top end 11 and the shaft 12.

When pressure is applied in the direction of an arrow illustrated in FIG. 2 with the above-described construction, a measuring object is transferred to the pressure sensing surface of the sensor element 22 in the sensor case 20 through the pressure introduction port 31 in the sensor protrusion portion 3. Then, the diaphragm of the sensor element 22 deforms according to the pressure of the measuring object. The value of change in the resistance of the diffused resistors (not shown) in correspondence with the deformation is taken as voltage out of the bridge circuit, and the voltage is amplified at the signal processing IC 23 and then outputted to the external processing circuit (not shown) through the lead frames 24 and the connector pins 28.

Next, referring to FIGS. 3A to 3C, which are step-by-step cross-sectional views, the method for installing the sensor device 2 in this embodiment will be described.

Figure 3A:
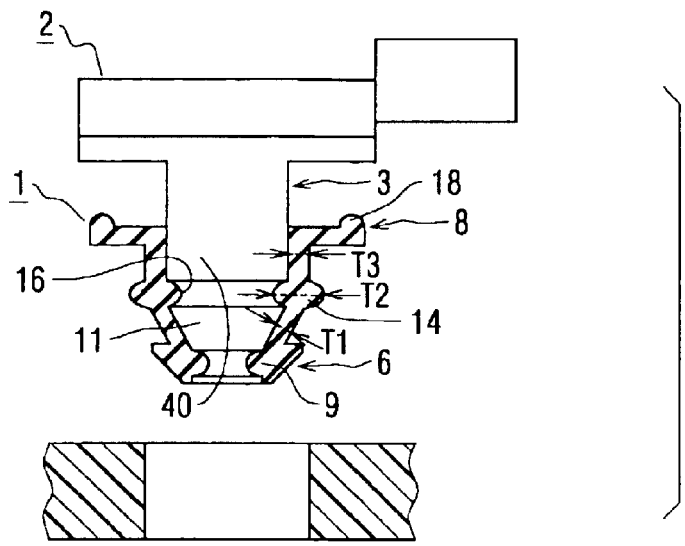
FIGS. 3A to 3C are cross-sectional views explaining an attachment method of the sensor device onto the sensor attachment member with the elastic member, according to the preferred embodiment.

As illustrated in FIG. 3A, a first step is a process in which the elastic member 1 is temporarily assembled onto the sensor protrusion portion 3 of the sensor device 2. The sensor protrusion portion 3 is inserted from the top end 11 side in a direction from the rear end portion 8 side toward the fore end portion 6 side of the hollow elastic member 1. Then, the intermediate protrusion 14 of the elastic member 1 is engaged with the concavity 16 of the sensor protrusion portion 3, and the fore end of the top end 11 of the sensor protrusion portion 3 is supported in the fore end protrusion 9 of the elastic member 1, so that the elastic member 1 is temporarily assembled so as to be held and prevented from droping off the sensor protrusion portion 3.

Figure 3B:
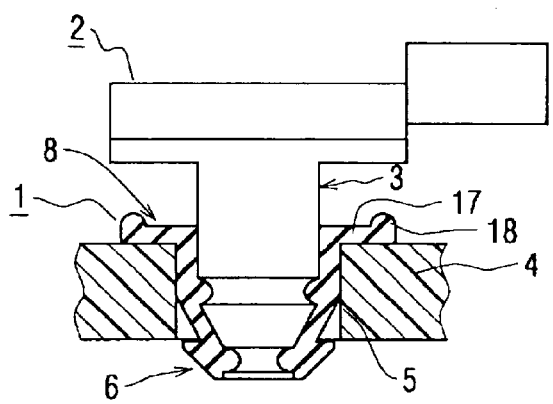

After the completion of the first step, a second step is carried out as illustrated in FIG. 3B. The second step is a process in which the elastic member 1 and the sensor protrusion portion 3 of the sensor device 2 temporarily assembled together are inserted into the through hole 5 in the sensor attachment member 4. The elastic member 1 and the sensor protrusion portion 3 are kept in the same state as the temporarily assembled state illustrated in FIG. 3A and inserted into the through hole 5 from the fore end portion 6 side of the elastic member 1. When the rear end flange 17 on the rear end portion 8 of the elastic member 1 is locked on the peripheral portion of the open end of the through hole 5, the insertion is completed.

Figure 3C:
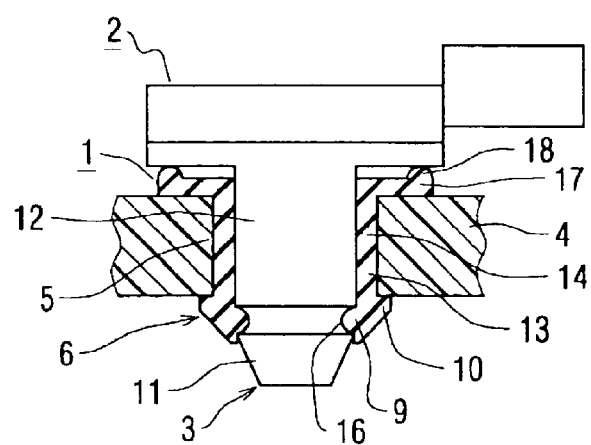

After the rear end flange 17 is locked on the peripheral portion of the open end of the through hole 5, a third step is carried out as illustrated in FIG. 3C. The third step is a process in which with the rear end flange 17 of the elastic member 1 locked on the peripheral portion of the open end of the through hole 5 in the sensor attachment member 4, the sensor protrusion portion 3 is inserted deeply so as to cause the top end 11 of the sensor protrusion portion 3 to protrude from the fore end portion 6 of the elastic member 1. In the state illustrated in FIG. 3C, the intermediate protrusion 14 of the elastic member 1 strides over the concavity 16 of the sensor protrusion portion 3 and is clamped between the inner circumferential surface of the through hole 5 and the outer circumferential surface of the shaft 12 of the sensor protrusion portion 3. Thus, the intermediate protrusion 14 hermetically seals the gap therebetween. Further, the fore end protrusion 9 of the elastic member 1 is engaged with the concavity 16 of the sensor protrusion portion 3, and thus the sensor 2 is held and prevented from droping off from the through hole 5. Furthermore, the tapered portion 13 of the elastic member 1 is pressed and expanded by the shaft 12 of the sensor protrusion portion 3 and press-contacted to the inner circumferential surface of the through hole 5. Therefore, the fore end flange 10 is locked on the peripheral portion of the open end of the through hole 5, so that the elastic member 1 is held and prevented from droping off from the through hole 5.

After the sensor device 2 undergoes the first to third steps described above, the sensor device 2 is fastened to the sensor attachment member 4 through the elastic member 1.

Next, referring to FIGS. 3A and 4, the action and effects of the thick portion 15 of the elastic member 1, which is one of the characteristics of the elastic member, will be described.

Figure 5A:
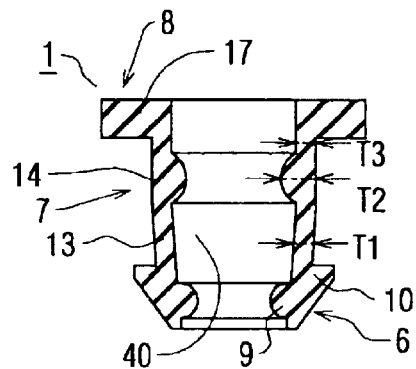
FIGS. 5A to 5D are cross-sectional views explaining an attachment method of a sensor device onto a sensor attachment member with an elastic member, according to a prior art.
Figure 5B:
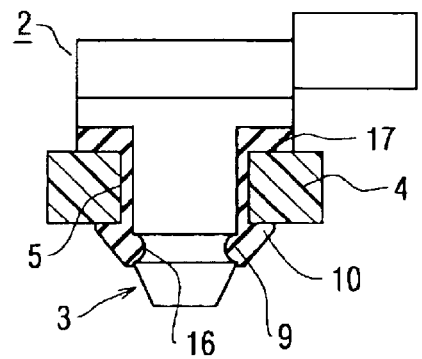

It is assumed that the thickness of the tapered portion 13 in the intermediate portion 7 of the elastic member 1, the thickness of the intermediate protrusion 14, and the thickness of the portion corresponding to the thick portion 15 be T1, T2, and T3, respectively, as illustrated in FIG. 3A. In the elastic member 1 according to the prior art shown in FIG. 5A, the thickness T1 of the tapered portion 13 and the thickness T3 of the portion corresponding to the thick portion 15 are substantially equal to each other.

Figure 5C:
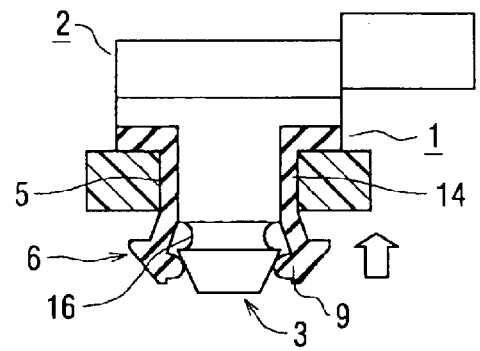

The elastic member 1 having the above-mentioned thickness according to the prior art is temporarily assembled onto the sensor device 2 so that the elastic member 1 is inserted into the through hole 5 whose diameter is equal to the lower limit value of tolerance on a design value. In the third step illustrated in FIG. 5C, the top end 11 of the sensor protrusion portion 3 is caused to protrude from the fore end portion 6 of the elastic member 1. At this time, if the diameter of the through hole 5 is small and the outside diameter of the intermediate portion 7 of the elastic member 1 is larger than the diameter of the through hole 5, the intermediate protrusion 14 of the elastic member 1 is clamped tightly between the inner circumferential surface of the through hole 5 and the outer circumferential surface of the shaft 12 of the sensor protrusion portion 3. Therefore, frictional force created between the elastic member 1 and the inner circumferential surface of the through hole 5 or the sensor protrusion portion 3 is increased. Therefore, the frictional force exceeds reaction force which works for returning the fore end protrusion 9 of the elastic member 1 from the fore end to the concavity 16 of the sensor protrusion portion 3. As a result, the fore end protrusion 9 of the elastic member 1 is prevented from engaging with the concavity 16 of the sensor protrusion portion 3, and thus required holding power cannot be obtained. Therefore, the sensor device 2 may drop off.

In this embodiment, the thickness T3 of the thick portion 15 becomes larger than the thickness T1 of the tapered portion 13. As a result, when the top end 11 of the sensor protrusion portion 3 is caused to protrude from the fore end portion 6 of the elastic member 1, frictional force created between the elastic member 1, and the inner circumferential surface of the through hole 5 and the sensor protrusion portion 3 is slightly increased. However, because of increasing the thickness T3, reaction force which works for returning the fore end protrusion 9 of the elastic member 1 from the fore end to the concavity 16 of the sensor protrusion portion 3 is increased more, so that the reaction force exceeds the frictional force. Therefore, the fore end protrusion 9 can be engaged with the concavity 16 of the sensor protrusion portion 3.

Accordingly, the holding power for holding the sensor device 2 is enhanced by forming the thick portion 15 thicker than the tapered portion 13 between the intermediate protrusion 14 and the rear end flange 17 of the elastic member 1 so as to increase the reaction force of the elastic member 1.

The thickness T2 of the intermediate protrusion 14 is so designed that when the elastic member 1 is inserted into the through hole 5 together with the sensor protrusion portion 3, the intermediate protrusion 14 collapses by an appropriate amount and hermetically seals the gap between the sensor protrusion portion 3 and the through hole 5. For example, if the thickness T3 of the thick portion 15 exceeds the thickness T2 of the intermediate protrusion 14, the amount of rubber collapse deviates from an appropriate range, so that cracking may occur in the rubber. Further, the intermediate protrusion 14 may not be provided with a sealing function. Therefore, the thickness T3 of the thick portion 15 should be set so that the relation, including the relation with the thickness T1 of the tapered portion 13, is expressed as follows:

$$T1 < T3 \leq T2 \tag{E1}$$

By forming the tapered portion 13, the intermediate protrusion 14, and the thick portion 15 in the intermediate portion 7 of the elastic member 1 such that Equation 1 is hold, the holding power of the elastic member 1 for holding the sensor device 2 is enhanced. The above-described action and effects of the thick portion 15 is verified by simulation, and it is confirmed that when Equation 1 holds, the fore end protrusion 9 is returned to the concavity 16 of the sensor protrusion portion 3 and engaged with the concavity 16, so that the holding power of the elastic member 1 for holding the sensor device 2 is enhanced.

Next, referring to FIG. 4, the action and effects of the bead portion 18 of the elastic member 1, which is another characteristics of this elastic member, will be described. FIG. 4 is a cross-sectional view illustrating the sensor device 2 assembled onto the sensor attachment member 4 through the elastic member 1 having the bead portion 18, which is one of the characteristics of this embodiment.

Figure 5D:
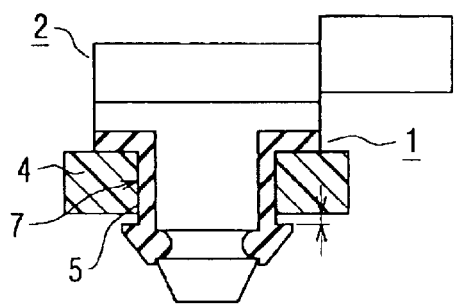

It is assumed that the elastic member 1 is so formed that the length of the portion thereof in contact with the inner circumferential surface of the sensor attachment member 4 (the length of the intermediate portion 7) is equal to the upper limit value of tolerance on a design value and the sensor attachment member 4 is so formed that the length thereof in the direction of insertion into the through hole 5 is smaller than the length of the intermediate portion 7. In this case, if the length of the shaft 12 of the sensor protrusion portion 3 is substantially equal to or larger than the total length of the intermediate portion 7 and the rear end portion 8 of the elastic member 1 when the third step is completed, a gap is produced between the elastic member 1 and the sensor attachment member 4, as shown in FIG. 5D. Further, if the length of the shaft 12 of the sensor protrusion portion 3 is smaller than the total length of the intermediate portion 7 and the rear end portion 8 of the elastic member 1 so that the rear end flange 17 of the elastic member 1 is pressed hard, the fore end protrusion 9 of the elastic member 1 is separated from the concavity 16 of the sensor protrusion portion 3 again. Therefore, if vibration is applied after assembling the sensor device, the elastic member 1 vibrates, and this may produce wear, cracking, or the like in the elastic member 1 and may cause the sensor device 2 to drop off.

Figure 4:
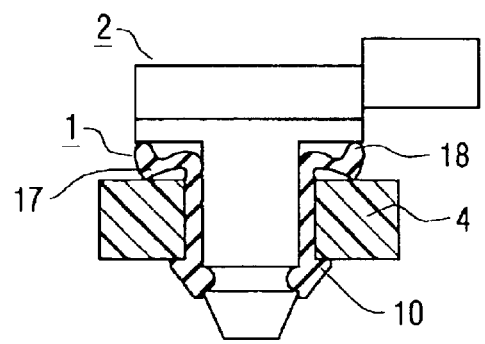
FIG. 4 is a cross-sectional view showing the sensor device attached onto the sensor attachment member with the elastic member, according to the preferred embodiment.

However, in this embodiment, as illustrated in FIG. 4, the surface of the rear end flange 17 of the elastic member 1 in contact with the sensor device 2 is provided with the elastically deformable projected bead portion 18 made of the same material as for the elastic member 1. Thus, the thickness of the rear end flange 17 with the bead portion 18 formed thereof is larger than the thickness of any other part of the rear end flange 17. Then, when the sensor device 2 is pushed in the third step, the sensor device 2 pushes the thickened rear end flange 17 having the bead portion 18, and thus the rear end flange 17 under the elastically deformed bead portion 18 holds the sensor attachment member 4, together with the fore end flange 10.

If the length of the intermediate portion 7 of the elastic member 1 is substantially equal to or smaller than the thickness of the sensor attachment member 4 and the shaft 12 of the sensor protrusion portion 3 of the sensor device 2 is longer, a gap is produced between the rear end flange 17 of the elastic member 1 and the sensor device 2. As a result, when the sensor device 2 is pushed and inserted in the third step, the fore end protrusion 9 of the elastic member 1 is disengaged from the concavity 16 of the sensor protrusion portion 3, so that required holding power may not be obtained. However, with the elastically deformable bead portion 18 formed on the rear end flange 17, the sensor device 2 is prevented from unnecessarily pushing the elastic member 1. Therefore, the elastic member 1 can hold the sensor device 2 and further hold the attachment member 4 as well, which makes it possible to firmly fasten the sensor device 2 to the sensor attachment member 4.

That is, if the length of the intermediate portion 7 of the elastic member 1 is equal to the maximum value of tolerance and the thickness of the sensor attachment member 4 is equal to the minimum value of tolerance, and if the thickness of the sensor attachment member 4 is equal to or larger than the length of the intermediate portion 7 of the elastic member 1, the bead portion 18 is only required to be elastically and deformably formed to a predetermined height so that the sensor device 2 can be held and further the sensor attachment member 4 can be firmly held between the rear end portion (the rear end flange 17 or the bead portion 18) and the fore end flange 10 of the elastic member 1 in a case where the sensor device 2 is pressed and inserted in.

Preferably, the length of the bead portion 18 is equal to a value obtained by adding a predetermined margin and the upper limit value of tolerance on a design value of the length of part of the elastic member 1 that contacts an inner circumferential surface of the through hole 5 (i.e., the length of the intermediate portion 7) when assembling is completed in the third step. In this case, with respect to the thickness of the sensor attachment member 4, variation is produced within tolerance on a design value. Therefore, the upper limit value of the tolerance is preferably taken as part of the above-described margin into account.

The bead portion 18 may be formed only on the surface of the rear end flange 17 in contact with the sensor attachment member 4, or may be formed both on the surface in contact with the sensor device 2 and on the surface in contact with the sensor attachment member 4.

Further, with respect to shape, the bead portion 18 may be annularly formed, or may be a plurality of projections having the same shape. Since the elastic member 1 is rotation-symmetrical, as described above, the sensor device 2 is prevented from being slantingly installed on the sensor attachment member 4 when a projection or projections having a length sufficient to cushion the above-described gap between the elastic member 1 and the sensor attachment member 4 are disposed in a rotation-symmetrical pattern.

By forming the elastically deformable projected bead portion 18 on the rear end flange 17 of the elastic member 1, the holding power for holding the sensor device 2 can be enhanced even if a gap is produced between the elastic member 1 and the sensor attachment member 4.

In addition, for example, if the diameter of the through hole 5 in the sensor attachment member 4 is equal to the upper limit value of tolerance on a design value, a gap is similarly produced between the inner circumferential surface of the through hole 5 and the outer circumferential surface of the intermediate portion 7 of the elastic member 1. In this case, by forming the elastically deformable bead portion 18 on either or both of the surface of the elastic member 1 in contact with the sensor device 2 and the surface thereof in contact with the sensor attachment member 4, the sensor attachment member 4 is held between the rear end flange 17 with the bead portion 18 formed thereon and the fore end flange 10 even if there is a gap between the through hole 5 in the sensor attachment member 4 and the elastic member 1. As a result, the sensor device 2 is firmly fastened to the sensor attachment member 4 by the elastic member 1. Therefore, the holding power for holding the sensor device 2 is enhanced.

Although the intermediate protrusion 14 of the elastic member 1 annularly protrudes both on the inner and outer circumferential surfaces of the intermediate portion 7, the intermediate protrusion 14 may be disposed on at least the inner circumferential surface side of the intermediate portion 7. In this case, the intermediate protrusion 14 can hold the sensor device 2 by engagement thereof with the concavity 16 of the temporarily assembled sensor protrusion portion 3 and can also seal the gap between the sensor protrusion portion 3 and the through hole 5 in the third step.

Such changes and modifications are to be understood as being within the scope of the present invention as defined by the appended claims.

What is claimed is:

1. An elastic member for attaching a sensor device having a sensor protrusion portion into a through hole of a sensor attachment member in such a manner that the elastic member is temporarily assembled onto the sensor protrusion portion and inserted together with the sensor protrusion portion into the through hole so that the sensor device is attached to the sensor attachment member through the elastic member, the elastic member comprising:

a hollow portion having an inner circumferential surface for being temporarily assembled onto the sensor protrusion portion; and a rear end portion having a rear end flange and a bead portion, wherein the rear end flange protrudes from an outer circumferential surface of the rear end portion for locking on a peripheral portion of one end of the through hole, and wherein the bead portion is elastically deformable in an insertion direction of the sensor device and protrudes in the insertion direction from either or both of one surface of the rear end flange facing the sensor device and the other surface of the rear end flange facing the sensor attachment member.

2. The elastic member according to claim 1, further comprising:

a fore end portion including a for end protrusion and a fore end flange; and an intermediate portion having an intermediate protrusion for covering at least part of the sensor protrusion portion, wherein the fore end protrusion protrudes from the inner circumferential surface of the hollow portion for engaging with a concavity disposed on a fore end side of the sensor protrusion portion, wherein the fore end flange protrudes from an outer circumferential surface of the fore end portion for locking on a peripheral portion of the other end of the through hole, and wherein the intermediate protrusion protrudes from at least the inner circumferential surface of the hollow portion.

3. The elastic member according to claim 1, wherein the bead portion is integrally molded with the rear end flange.

4. The elastic member according to claim 1, wherein the bead portion is an annular projection.

5. The elastic member according to claim 1, wherein the bead portion is composed of a plurality of projections having the same shape.

6. The elastic member according to claim 1, wherein the bead portion is disposed on a periphery of the rear end flange.

7. The elastic member according to claim 2, wherein the elastic member is rotation-symmetrical around a center axis of the elastic member, the center axis being along with a direction of insertion of the sensor protrusion portion.

8. The elastic member according to claim 2, wherein a height of the bead portion from the surface of the rear end flange is equal to a total length obtained by adding a predetermined margin and an upper limit value of tolerance of a length of part of the elastic member that contacts an inner circumferential surface of the through hole.

9. The elastic member according to claim 2, wherein the intermediate portion further includes a thick portion disposed between the intermediate protrusion and the rear end flange, thickness of the thick portion is thicker than thickness of the intermediate portion.

10. The elastic member according to claim 9, wherein the thickness of the thick portion is equal to or thinner than thickness of the intermediate protrusion.

11. The elastic member according to claim 10, wherein the bead portion is an annular projection and disposed on a periphery of the rear end flange.

12. The elastic member according to claim 11, wherein the intermediate protrusion protrudes from both of the inner circumferential surface of the hollow portion and the outer circumferential surface of the intermediate portion so that the intermediate protrusion is an annular projection.

* * * * *